No. 668,067. Patented Feb. 12, 1901.
R. O. STUTSMAN.
RUBBER TIRE SETTER.
(Application filed July 16, 1897.)
(No Model.)
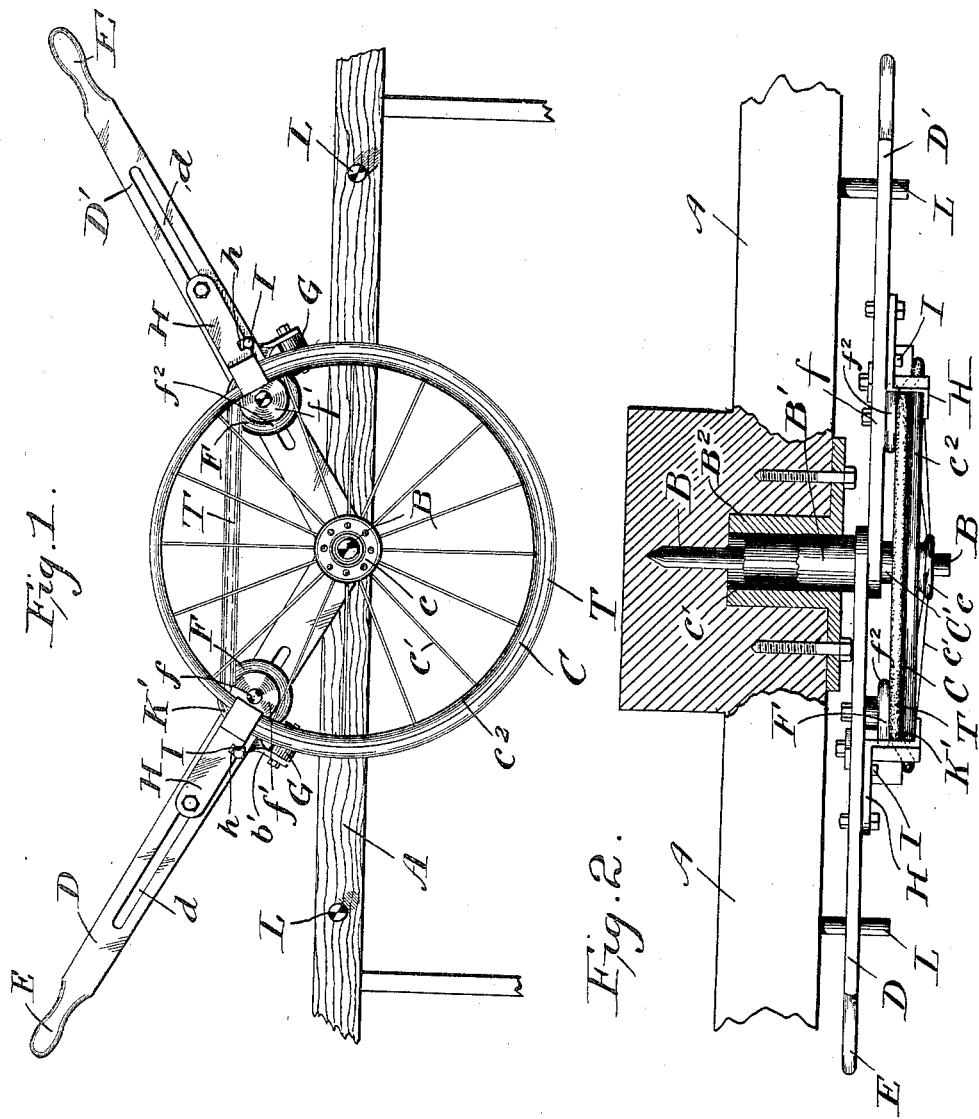
Witnesses,
Arthur L. Bryant
M. L. Cavanagh.
Inventor,
Reuben O. Stutsman.
By N. H. Bliss
Atty.

UNITED STATES PATENT OFFICE.

REUBEN O. STUTSMAN, OF DES MOINES, IOWA, ASSIGNOR TO THE BARTHOLOMEW COMPANY, OF SAME PLACE.

RUBBER-TIRE SETTER.

SPECIFICATION forming part of Letters Patent No. 668,067, dated February 12, 1901.

Application filed July 16, 1897. Serial No. 644,798. (No model.)

*To all whom it may concern:*

Be it known that I, REUBEN O. STUTSMAN, a citizen of the United States, residing at Des Moines, in the county of Polk and State of Iowa, have invented certain new and useful Improvements in Apparatus for Applying Rubber Tires to Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a side elevation illustrating my improved apparatus and the manner of using the same. Fig. 2 is a top plan view, partly in section.

A designates a suitable framework or stand, which carries a horizontally-arranged laterally-projecting spindle or wheel-support B, adapted to support a wheel during the securing of a tire thereto. C designates such a wheel, it having a hub $c$, the spokes $c'$, and the rim $c^2$, the latter being provided in its outer face with a groove to receive the tire T.

D D' designate two lever-arms, which are fulcrumed on the axle B, being secured to sleeves B' C', respectively, which sleeves are arranged concentrically about the axis of the wheel-support B and extend into a bearing $B^2$ on the main frame A. The arms D D' are thus arranged between the wheel C and the frame A and are adapted to swing vertically, each being provided at its outer end with a handle portion E and also supporting a flanged roller or wheel F. The wheels F are mounted on horizontal axes parallel to that of the spindle B, they being carried by shafts $f$, extending through longitudinal slots $d$, formed in the arms D D', so that said wheels can be adjusted toward or from the axle B to adapt the apparatus for use with wheels of different sizes.

By reference to Fig. 1 it will be seen that the wheels are so adjusted that the periphery of the body portion $f'$ thereof will move parallel to the wheel-rim, and the vertical flange $f^2$ of said wheels will extend beyond the edge of said rim on the side adjacent to the lever-arms D D'. By this construction the body $f'$ of said wheels serves to support the tire T while it is being adjusted into position on the wheel C, and the flange $f^2$ prevents any lateral movement of the tire in the direction of the lever-arms and the frame A. On the arms D D' are also mounted auxiliary guide-rollers G, they being arranged to extend at right angles to the axis of the wheels F and being preferably supported in brackets $b'$, which extend laterally from said levers. I preferably make the sleeve C', which is placed within the sleeve B' and has the lever-arm D' connected thereto, of such length that its outer end serves as an abutment against which the inner face of the hub $c$ bears, and to prevent lateral movement of the wheel in the opposite direction the lever-arms D D' are provided with plates H. These are pivotally mounted on the levers D D' and have their lower inner ends bent to extend across the periphery of the wheel C and also over the outer face or edge of the rim thereof. When in use, said plates are held in position by pins I, projecting from the levers D D' and extending through notches $h$, formed in the lower edges of the plates H. The plates H also act as guides for the tire T, the latter being held between said plates and the rollers F G.

The manner of using my improvement may be briefly stated as follows: The wheel C is slipped upon the spindle B. The wheels F are adjusted so that their flange portion $f^2$ will extend across the face of the rim $c^2$, adjacent to the levers D D'. The tire T is then placed by hand in the lower portion of the groove in the rim of the wheel and the upper portion of said tire slipped over the body portion of said wheels F. The plates H are then moved into the position shown in Fig. 1, and the tire is then supported against both vertical and lateral movement. Then by moving the levers toward a vertical position the portion K' of the tire is lifted and guided into the groove in the upper portion of the rim of the wheel. As the levers D D' approach each other the portion of the tire between the wheels F which normally occupies a horizontal position will be stretched sufficiently to be brought into the planes of the wheel-rim and will by its elasticity be drawn into the groove in said rim. It will be seen, however, that I do not depend exclusively upon the elasticity of the tire to cause it to pass over the edge of the rim, but that I have provided means for positively moving it laterally into the groove formed in the periphery of the rim—that is, the wheel or roller G, following each roller F and bearing against the wheel-rim, insures that the tire will be properly placed on said rim. It will be noticed that the tire is held against movement laterally toward the operating-levers both by the flange $f^2$ of the wheels F and the rollers G and that the free ends of the plates H prevent any movement thereof laterally in the opposite direction. By swinging the plates H about their pivots the wheel C will be released and can be readily slipped from the spindle-axle B.

Stop-pins L may be provided on the frame A to support the outer ends of the levers D D' when not in use.

I am aware that prior to my invention it has been proposed to place rubber tires upon vehicle-wheels by means of two levers adapted to swing toward each other and having means for engaging with the tire; but in the earlier constructions referred to said levers were carried by a bar or plate which had to be first secured in a position upon the hub of the wheel to be operated on, requiring considerable time to place the wheel in position and to remove the apparatus therefrom after the tire had been adjusted. Again, in such earlier construction the wheel was held in a horizontal position, requiring the operator to hold the tire in place in the groove in the rim for a relatively long time, and, again, the tire was not positively held on both its inner and its outer face, as by my improvements.

It will be noticed that it is not necessary with my construction to remove the levers D D', but the mere raising of the guide-plates H releases the wheel, and also that the wheels F positively support the tire and prevent it from becoming disengaged from the lower portion of the rim while being adjusted in the upper portion. It will not only be thus seen that in my mechanism the wheel and the levers which support the tire-carriers are mounted upon the frame independently of each other, but also that the tire-carriers move as they mutually approach in paths which are concentric with the wheel-axis, and consequently bring the tire to its place on the rim in a manner much superior to that followed when the levers are pivoted at points eccentric to the wheel-axis.

What I claim is—

1. In an apparatus for applying rubber tires to vehicle-wheels, the combination with a frame or stand having a projecting wheel-supporting spindle, two pivotally-mounted lever-arms, two guide-rollers mounted on each of said arms to contact with a tire at one side of a wheel on said spindle, said rollers having their axes arranged at right angles to each other, and means mounted on said arms and adapted to contact with the tire on the opposite side of the wheel; substantially as set forth.

2. In an apparatus for placing rubber tires upon vehicle-wheels, the combination of a stationary horizontal wheel-support or spindle, B, two arms adapted to rock about the axis of said support, wheels, F, mounted on said arms and adapted to initially support the tire and contact with the side thereof adjacent to the said arms, and plates, H, pivotally mounted on said arms and adapted to contact with the opposite face of the tire; substantially as set forth.

3. In an apparatus for applying rubber tires to vehicle-wheels, the combination of a stationary wheel-support, B, two arms or levers mounted on and adapted to rock about said support, a wheel, F, adjustably mounted on each of said arms on an axis substantially parallel to the wheel-support, auxiliary rollers, G, carried by said arms, and having their axes arranged at right angles to that of the wheels, F, both said wheels and rollers arranged at one side of the wheel on the support, and means carried by the arms for contacting with the tire on the opposite side of the wheel; substantially as set forth.

4. In an apparatus for applying rubber tires to vehicle-wheels, the combination of a frame having a laterally-projecting wheel-support, B, two arms mounted on said support between said frame and the wheel to be operated on and means on said arm for contacting with the opposite side of the wheel-rim; substantially as set forth.

5. In a mechanism for applying rubber tires to wheel-rims, the combination of a wheel-support adapted to hold the wheel properly relatively to a central axis, and two movable mutually-approaching tire-carriers moving in paths concentric with the said axis, and each arranged to force the portion of the tire engaged thereby radially of the wheel to the edge of the rim at all points in its path, substantially as set forth.

6. In a mechanism for applying rubber tires to wheel-rims, the combination of a wheel-support adapted to hold the wheel properly relatively to a central axis, and two vibrating levers each having a tire-carrier secured thereto and both pivoted at the axis of the wheel, whereby the tire-carriers can be caused by said levers to move concentrically with the wheel-rim as they approach toward each other, to force that portion of the tire which is disengaged from the rim to the outer edge of the adjacent portion of the rim, substantially as set forth.

7. In a mechanism for applying rubber tires to wheel-rims, the combination of a frame, a wheel-holder on said frame adapted to support a wheel detachably, and two levers pivotally supported upon said frame, independently of the wheel, and each having a swinging tire-carrier, adapted to guide a tire into position on a wheel mounted on said wheel-holder, whereby the wheel can be attached to or withdrawn from its support independently of any adjustment of the levers, substantially as set forth.

8. In a mechanism for applying rubber tires to wheel-rims, the combination of a frame, a horizontal wheel-spindle carried by said frame, two concentric sleeves fitted about said spindle, a lever connected to each of said sleeves and arranged to extend between the frame and a wheel supported upon the spindle, a tire-carrier mounted on each of said levers and adapted to engage with the inner face of the tire and to limit movement of the tire laterally toward the frame, and means on said levers for limiting the movement of the tire laterally in the opposite direction, substantially as set forth.

9. In a mechanism for applying rubber tires to wheel-rims, the combination of a frame, a wheel-holder on said frame adapted to detachably support a wheel, two levers pivotally supported upon said frame, independently and at one side of the wheel, and adapted to engage with and positively force a tire into engagement with the wheel-rim, and means carried by said levers for detachably engaging with the opposite side of the wheel, to hold the same against movement away from said levers while the tire is being applied, substantially as set forth.

10. In a mechanism for applying rubber tires to wheel-rims, the combination of a horizontal wheel-supporting spindle, a stationary abutment about said spindle, two levers pivotally supported to rock about the axis of said spindle, said levers being arranged on the same side of the wheel as said abutment, means carried by said levers for positively forcing a tire into position on the wheel-rim, and means carried by the levers for detachably connecting the same with the wheel and holding the latter against the aforesaid abutment, substantially as set forth.

11. In an apparatus for applying rubber tires to wheels, the combination of a support for a wheel, movable tire-adjusting devices arranged to force a tire radially of the wheel to the outer edge of the rim thereof, and supplemental means moving with said adjusting devices for forcing the tire laterally across said edge onto the periphery of the rim, substantially as set forth.

12. In an apparatus for applying rubber tires to wheels, the combination of means for supporting a wheel, two arms pivotally supported to vibrate about the axis of the wheel, means on each of said levers for engaging with the inner surface of a tire, and adapted as said levers are moved toward each other to force a portion of the tire radially of the wheel to bring the inner surface of the tire into the planes of the periphery of the wheel-rim, and supplemental means carried by each of said arms for bearing against the side surface or face of the tire, in rear of the point engaged by said radially-adjusting devices, to force the tire laterally onto the rim, substantially as set forth.

13. In an apparatus for applying rubber tires to wheels, the combination of a wheel-support, means for engaging a tire when partially in position on the wheel, an expanding or stretching device arranged to engage with that portion of the tire which is disengaged from the rim, and means for moving said expanding or stretching device about the axis of the wheel to force such portion of the tire radially of the wheel and onto the adjacent portion of the rim, substantially as set forth.

14. In an apparatus for applying rubber tires to wheels, the combination of a wheel-support, and tire-adjusting devices mounted to move about the axis of the wheel to which the tire is to be applied and comprising guides between which the wheel-rim extends and a tire-expanding roller, independent of said guides, and adapted, as said devices are moved about the wheel-axis, to engage with the portion of the tire that is disengaged from the rim and force the same radially of the wheel to the periphery thereof, substantially as set forth.

15. In an apparatus for applying rubber tires to wheels, the combination of a wheel, and tire-adjusting devices mounted to move about the axis of the wheel, and comprising means for retaining a tire, which is partially engaged with the wheel-rim in position, and means for engaging the disengaged portion of the tire and moving it radially of the wheel to the plane of the outer edge of the wheel-rim, substantially as set forth.

16. In an apparatus for applying rubber tires to wheel-rims, the combination of a wheel-support, and means pivotally mounted on said support and situated at one side of a wheel when placed in position on said support, said means comprising devices for holding a tire in partial engagement with the wheel-rim and for moving the disengaged portion of the tire radially of the wheel to the outer edge of the rim thereof, substantially as set forth.

In testimony whereof I affix my signature in presence of two witnesses.

REUBEN O. STUTSMAN.

Witnesses:
  L. W. CANNON,
  O. T. BLACK.